(12) United States Patent
Eastlake, III et al.

(10) Patent No.: US 11,616,717 B2
(45) Date of Patent: Mar. 28, 2023

(54) SERVICE FUNCTION CHAINING NETWORK SERVICES

(71) Applicant: Huawei Technologies Co., Ltd., Shenzhen (CN)

(72) Inventors: Donald E. Eastlake, III, Davenport, FL (US); Andrew G. Malis, Andover, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 17/116,894

(22) Filed: Dec. 9, 2020

(65) Prior Publication Data

US 2021/0119909 A1    Apr. 22, 2021

Related U.S. Application Data

(63) Continuation of application No. PCT/CN2019/120082, filed on Nov. 22, 2019.
(Continued)

(51) Int. Cl.
*H04L 45/302* (2022.01)
*H04L 45/00* (2022.01)
*H04L 69/22* (2022.01)

(52) U.S. Cl.
CPC ............ *H04L 45/306* (2013.01); *H04L 45/38* (2013.01); *H04L 45/54* (2013.01); *H04L 69/22* (2013.01)

(58) Field of Classification Search
None
See application file for complete search history.

(56) References Cited

U.S. PATENT DOCUMENTS

| 10,187,306 B2* | 1/2019 | Nainar | H04L 45/64 |
| 2017/0279712 A1* | 9/2017 | Nainar | H04L 45/64 |

(Continued)

FOREIGN PATENT DOCUMENTS

| JP | 2017135449 A | 8/2017 |
| JP | 2018518927 A | 7/2018 |

(Continued)

OTHER PUBLICATIONS

Extended European Search Report dated Nov. 19, 2021, European Application No. 19887261.6.
(Continued)

*Primary Examiner* — Xavier S Wong
(74) *Attorney, Agent, or Firm* — Vierra Magen Marcus LLP

(57) ABSTRACT

The disclosed technology relates to forwarding a packet in a network. The packet is received at a node, where the packet is encapsulated by a network service header (NSH) including a service path header that identifies a service path. The service path is associated with a treatment value that directs subsequent nodes to treat the encapsulated NSH packet with a quality of service treatment. A forwarding table stored in the node is evaluated to identify the service path and the treatment value of the encapsulated NSH packet and a quality of service treatment is determined for the encapsulated NSH packet. The encapsulated NSH packet is forwarded to the subsequent nodes based on the service path indicated in the forwarding table and in accordance with the quality of service treatment corresponding to the treatment value identified in the forwarding table.

34 Claims, 8 Drawing Sheets

Related U.S. Application Data

(60) Provisional application No. 62/770,855, filed on Nov. 23, 2018.

(56) References Cited

U.S. PATENT DOCUMENTS

| | | | |
|---|---|---|---|
| 2017/0317926 A1* | 11/2017 | Penno | H04L 45/64 |
| 2017/0331737 A1 | 11/2017 | Ruan et al. | |
| 2018/0091420 A1* | 3/2018 | Drake | H04L 45/306 |
| 2018/0205643 A1 | 7/2018 | Patil et al. | |
| 2018/0227226 A1 | 8/2018 | Lu et al. | |

FOREIGN PATENT DOCUMENTS

| | | |
|---|---|---|
| JP | 2018528664 A | 9/2018 |
| JP | 2021514594 A | 6/2021 |
| WO | 2020103917 | 5/2020 |

OTHER PUBLICATIONS

Ericsson, Halpern J. et al., "Service Function Chaining (SFC) Architecture", Internet Engineering Task Force (IETF), RFC 7665, Informational SFC Architecture; Oct. 2015, pp. 1-31.

Quinn, Paul et al., "Network Service Header (NSH)", Internet Engineering Task Force (IETF), RFC 8300, Standards Track, Jan. 2018, pp. 1-39.

Notice of Reasons for Rejection dated Jun. 27, 2022, Japanese Patent Application No. 2021-529018.

Notice of Allowance dated Nov. 21, 2022, Japanese Patent Application No. 2021-529018.

* cited by examiner

800B

| SPI 702 | Service Index 802 | Color 804 | Output Port | Output Encapsulation | Destination Address | Decapsulation Flag | Decapsulation Flag |
|---|---|---|---|---|---|---|---|
| ... | ... | ... | ... | ... | ... | ... | ... |
| A1 | k | Red | | | | | |
| A2 | k | Green | | | | | |
| B1 | m | Red | | | | | |
| B2 | m | Blue | | | | | |
| B3 | m | Purple | | | | | |
| B4 | k | [empty] | | | | | |

*FIG. 8B*

SERVICE FUNCTION CHAINING NETWORK SERVICES

CLAIM FOR PRIORITY

This application is a Continuation of and claims the benefit of priority to International Patent Application No. PCT/CN2019/120082, filed Nov. 22, 2019, which claims the benefit of priority to U.S. Patent Application No. 62/770,855, filed Nov. 23, 2018, the entire contents of which are hereby incorporated by reference.

TECHNICAL FIELD

The disclosure generally relates to routing packets in a service function chaining domain.

BACKGROUND

Network operators, and in particular mobile network operators, want to offer various value added services to their customers. Examples of such services include deep packet inspection (DPI), parental controls, SSL traffic optimization, network address translation (NAT) and others. In the past, network operators often deployed specialized network elements to be able offer a particular service. However, this approach is inflexible, expensive to operate and does not scale well.

Recently, network operators have moved towards service function chaining or service chaining. In this approach, each of the supported services can be modeled as combination of one or more service functions (SF), where the role of each service function is to perform a specific task on a network packet or set of packets. For a given service, the service functions are applied in a sequential manner, i.e., by directing network traffic through them in a specified manner. This technique is known as service function chaining, and those chains are typically referred to as service function chains (SFCs).

The entity that selects the appropriate chain for the received traffic is typically called a 'classifier' (also referred to as a 'service classifier' or 'SFC classifier'). The classifier may also perform a load balancing function to select the least loaded service function chain or to wean traffic away from a service function chain containing a node that might need to be taken out of service. There can be multiple active classifiers at any time. The service function chains, including the service functions that they include, are dictated by a static configuration. To change the chain, the configuration is edited, for example by a system user, and installed at the service function forwarders along the chain.

SUMMARY

According to one aspect of the present disclosure, there is a computer-implemented method for forwarding a packet in a network, comprising receiving the packet at a node belonging to a service function chain (SFC) in the network, wherein the packet is encapsulated by a network service header (NSH) comprising a service path header that identifies a service path, and directing one or more subsequent nodes within the network to treat the encapsulated NSH packet with a quality of service treatment based on a treatment value corresponding to the service path; evaluating a forwarding table stored in the node to identify the service path and the treatment value of the encapsulated NSH packet and determining the quality of service treatment of the encapsulated NSH packet to be performed by the one or more subsequent nodes; and forwarding the encapsulated NSH packet to the one or more subsequent nodes based on the service path indicated in the forwarding table and in accordance with the quality of service treatment corresponding to the treatment value identified in the forwarding table.

Optionally, in any of the preceding aspects, the service path header includes a service path identifier (SPI) comprising a path index (PI) indicating the service path and a treatment index indicating the treatment value, and a service index (SI) indicating a location of the encapsulate NSH packet in the service chain, and the treatment value indicates the quality of service treatment for the encapsulated NSH packet.

Optionally, in any of the preceding aspects, the SPI comprises an upper most one or more bits of the service path header and the SI comprises a lower most one or more bits of the service path header, the total number of the upper most one or more bits is 24, the total number of the lower most one or more bits is 8, and the total number of one or more bits comprising the service path header is 32.

Optionally, in any of the preceding aspects, the treatment index comprises N one or more bits of the SPI, and the PI comprises (24−N) one or more bits of the SPI.

Optionally, in any of the preceding aspects, the one or more bits comprising the PI are in a fixed position of the upper most one or more bits in the SPI, and the one or more bits comprising treatment index are a fixed position in the lower most one or more bits of the SPI, or the one or more bits of the PI and the treatment index are randomly positioned in the SPI.

Optionally, in any of the preceding aspects, the forwarding table includes n entries for each service path of the encapsulated NSH packet, where n is a number of different treatment values associated with the service path.

Optionally, in any of the preceding aspects, the service path header includes the service index (SI) indicating the treatment value and a location of the packet in the service chain, and the treatment value indicates the quality of service treatment for the encapsulated NSH packet.

Optionally, in any of the preceding aspects, the forwarding table comprises a service path identifier (SPI) indicating the service path, a service index (SI) indicating a location of the encapsulate NSH packet in the service chain, and a treatment index indicating the treatment value, and the treatment value indicates the quality of service treatment for the encapsulated NSH packet.

Optionally, in any of the preceding aspects, the network is an SFC-enabled domain.

Optionally, in any of the preceding aspects, the computer-implemented method further comprises processing the encapsulated NSH packet according to a service function associated with the node.

Optionally, in any of the preceding aspects, the computer-implemented method further comprises decapsulating the encapsulated NSH packet by removing the NSH, and forwarding the decapsulated packet towards a destination address determined in accordance with information in the header of the decapsulated packet.

According to one other aspect of the present disclosure, there is a non-transitory computer-readable medium storing computer instructions for forwarding a packet in a network, that when executed by one or more processors, cause the one or more processors to perform the steps of receiving the packet at a node belonging to a service function chain (SFC) in the network, wherein the packet is encapsulated by a network service header (NSH) that includes a service path header that identifies a service path, and directing one or more subsequent nodes within the network to treat the encapsulated NSH packet with a quality of service treatment based on a treatment value corresponding to the service path; evaluating a forwarding table stored in the node to identify the service path and the treatment value of the encapsulated NSH packet and determining the quality of service treatment of the encapsulated NSH packet to be performed by the one or more subsequent nodes; and forwarding the encapsulated NSH packet to the one or more subsequent nodes based on the service path indicated in the forwarding table and in accordance with the quality of service treatment corresponding to the treatment value identified in the forwarding table.

According to one other aspect of the present disclosure, there is a node for forwarding a packet in a network, the router comprising a non-transitory memory storage comprising instructions; and one or more processors in communication with the memory storage, wherein the one or more processors execute the instructions to receive the packet at a node belonging to a service function chain (SFC) in the network, wherein the packet is encapsulated by a network service header (NSH) that includes a service path header that identifies a service path, and directing one or more subsequent nodes within the network to treat the encapsulated NSH packet with a quality of service treatment based on a treatment value corresponding to the service path; evaluate a forwarding table stored in the node to identify the service path and the treatment value of the encapsulated NSH packet and determine the quality of service treatment of the encapsulated NSH packet to be performed by the one or more subsequent nodes; and forward the encapsulated NSH packet to the one or more subsequent nodes based on the service path indicated in the forwarding table and in accordance with the quality of service treatment corresponding to the treatment value identified in the forwarding table.

According to another aspect of the present disclosure, there is a node for forwarding a packet in a network, the node comprising a receiving module for receiving the packet at a node belonging to a service function chain (SFC) in the network, wherein the packet is encapsulated by a network service header (NSH) comprising a service path header that identifies a service path, and the service path is associated with a treatment value that directs one or more subsequent nodes within the network to treat the encapsulated NSH packet with a quality of service treatment; an evaluating module for evaluating a forwarding table stored in the node to identify the service path and the treatment value of the encapsulated NSH packet and determining the quality of service treatment of the encapsulated NSH packet to be performed by the one or more subsequent nodes; and a forwarding module for forwarding the encapsulated NSH packet to the one or more subsequent nodes based on the service path indicated in the forwarding table and in accordance with the quality of service treatment corresponding to the treatment value identified in the forwarding table.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 8B illustrates another example of a forwarding information base table for a service function forwarder.

DETAILED DESCRIPTION

The present disclosure will now be described with reference to the figures, which in general relate to service function chains.

Disclosed herein are various embodiments for routing and implementing service functions along service function chains and service function paths. Many emerging services, such as multimedia transmission and virtual private networks, require careful allocation of resources in an Internet Protocol (IP) network. To allocate sufficient resources for such services, service providers need to know the bounds for supporting offered traffic. A service level agreement (SLA) between a customer and a service provider specifies these bounds, which constitute a traffic policy or a mechanism by which to measure and treat a quality of service (QoS). Traffic that conforms to the bounds is serviced by the network according to the desired QoS specified in the SLA, whereas any excess traffic is forwarded without any guarantees.

In general, the enforcement of an SLA occurs at the interface between different network domains. As explained in more detail below, an edge or boundary node/router meters and marks incoming traffic to ensure that the traffic conforms to the instituted policies. In one embodiment, the various policies may be identified by marking incoming packets with a "color" using a network service header (NSH) of an NSH encapsulated data packet. The NSH header may use identifying information, such as bits in one of the NSH header fields, to indicate a specific color (or treatment value), and thereby indicate the specific policing (or servicing) mechanism by which to the handle the packet. In one embodiment, the bits are set in the service path identifier (SPI) of the NSH header. In another embodiment, the bits are set in the service index (SI) of the NSH header. Once the packet is marked, congestion control mechanisms inside the network domain use the result of the marking mechanism to determine which packets to handle and which packets to drop during congestion It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
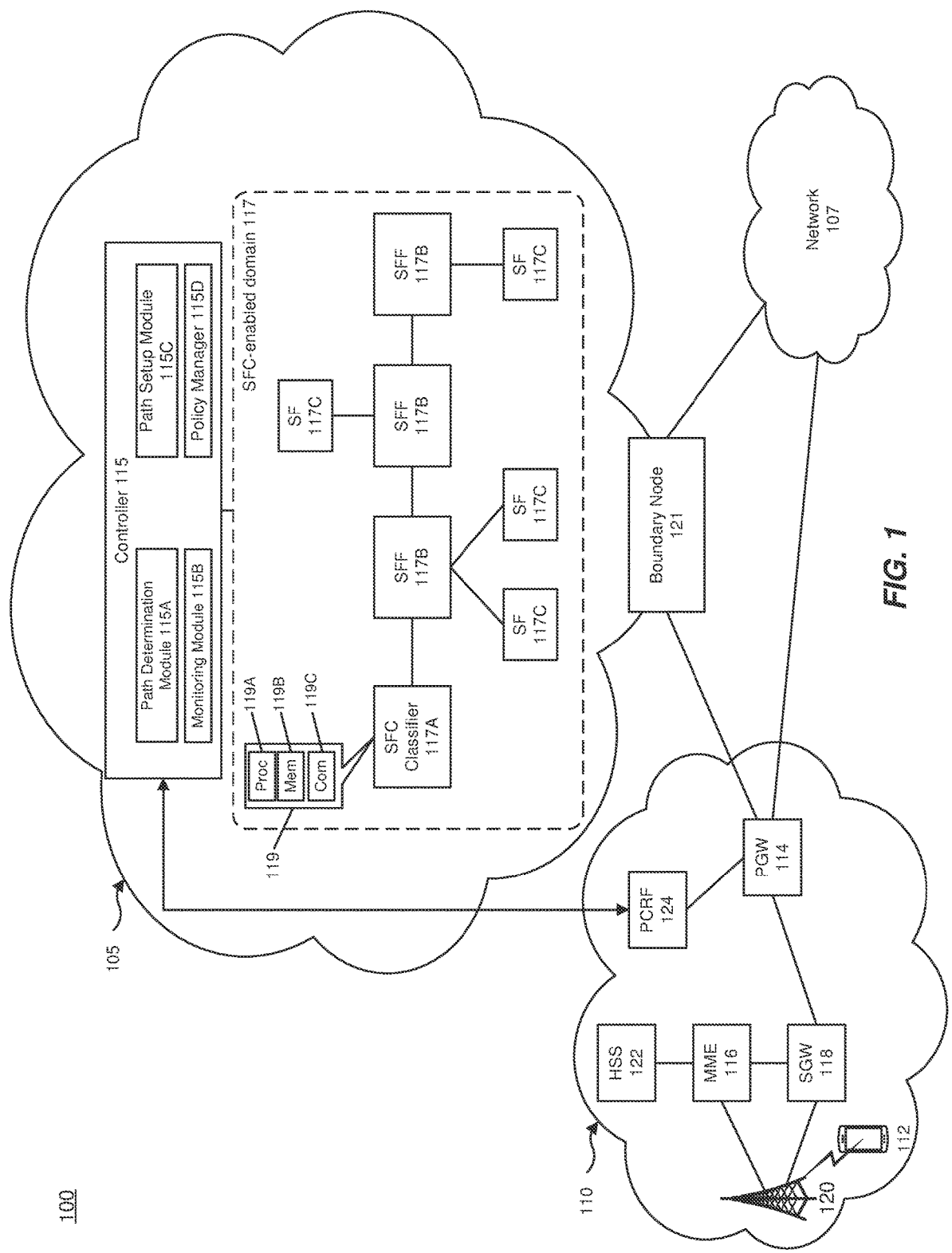
FIG. 1 illustrates an example system of performing service function chaining to provide services to a mobile network with an end subscriber.

FIG. 1 illustrates an example system of performing service function chaining to provide services to a mobile network with an end subscriber. The system 100 includes a service function chain (SFC) network 105, a mobile network 110 and a network 107, such as the Internet. In general, an SFC includes a sequence of service functions (or service function instances) that reside on various network nodes. That is, an SFC is an ordered set of service functions (SFs) and ordering constraints that is applied to data packets, data frames, and/or data flows. An SFC may comprise one or more service function paths (SFPs) along the SFC. When traffic is forwarded from a user or user equipment, such as user equipment 112, over an SFC, packets in the traffic traverse the SFP in order and are processed by the various service functions, with each service function applying a specific function, such as a firewall, network access translation (NAT), deep packet inspection (DPI), etc., prior to forwarding the packets to the next network node.

In the embodiment of FIG. 1, SFC network 105 includes a controller 115, SFC-enabled domain 117 and boundary node 121. The controller 115 may control the SFC-enabled domain 117, which includes an SFC classifier 117A, service function forwarders (SFFs) 117B and service functions (SFs) 117C. In particular, the controller 115 may include a path determination module 115A which determines a path (e.g., a service function path (SFP)) on which a packet is processed; a monitoring unit 115B which monitors state information on the SFC classifier node 117A, the SFFs 117B, and the SFs 117C; a path setup module 115C which sets the determined path to the SFC-enabled domain 117; and a policy manager 117D that manages how packets are treated according to various policies or agreed upon services (individually or together referred to herein as quality of service treatment). The SFC-enabled domain 117 may then process the received packet based on the SFP set by the controller 115.

The policy manager 115D configures network nodes, boundary node 121, to control the coloring of packets within the SFC-enabled domain 117. For example, policy manager 115D may set the network nodes to color all Voice Over IP (VoIP) packets for a particular flow with the color "green" (e.g., high priority) and all File Transfer Protocol (FTP) packets of a particular flow with the color "yellow" (e.g., low priority). A color may be associated with one or more Quality of Service (QoS) treatment parameters, e.g., a pre-defined differentiated services code point (DSCP) value and possibly other values or characteristics. Although not depicted, the policy manager 115D may be coupled to and communicate with any of the network nodes.

In one embodiment, policy manager 115D provides a mechanism whereby a network administrator may define an initial QoS treatment that is applied to the different services and flows within SFC-enabled domain 117. For example, an administrator may define an initial QoS treatment for a particular flow by setting an initial DSCP value in the packets which may be associated with a specific color that is marked in the packet. Using the colors marked in a packet, policy manager 115D may communicate with meters and markers (discussed below) or other components to dynamically color the packets for each flow based on the current bandwidth or throughput of the SFC-enabled domain 117 and the bandwidth needs for each particular flow.

The service classifier 117A is a node that classifies packets and assigns them to SFCs. A service classifier may refer to a functional entity which performs classification or service classification. Here, the classification may refer to a process in which traffic is classified in customer/service units by a policy and the SFs used by the corresponding customer are classified according to a profile. That is, the classification may be performed through a forwarding policy suitable for the traffic and the identification of the user and the network profiles.

The SFC classifier 117A, SFFs 117B and SFs 117C may (or may not) be physically co-located. Any one or more of these components can be an independent process in one physical node or virtualized. In order to identify SFs uniquely, each given a unique identifier known as service function identifier. In addition to the service function identifier, each SF carries a service-function-locater attribute. The service-function-attribute can be an Internet Protocol (IP) address, fully qualified domain name (FQDN) or Layer 4 port number. SFC classifiers and SFs use the locater as the destination address of the traffic. To effect the SFC network 105, a data plane typically carries the actual traffic; a control plane is typically used to manage and coordinate the traffic flow amongst service nodes.

The SFF 117B performs a function which forwards the received packet to the SFs 117C. That is, the SFF 117B may forward traffic or a packet to at least one SF 117C. In one embodiment, the SFF 117B may perform a function which forwards the packet to another SFF 117B.

A service function path (SFP), which may also be referred to as an explicit path, determined by the afore-mentioned path determination module 115A, may refer to a physical or virtual network path through which the packet passes to implement the SFC of an abstract concept. As understood (and depicted in the example embodiment), one or more SFFs 117B and one or more SFs 117C may be present on the SFP.

The SF 117C node is a function that implements a specific treatment for a data packet, and which may act at various layers of a protocol stack, for example, at the network layer or other OSI layers. An SF can be realized as a virtual element, a physical network element or embedded in a physical network element. One or more SFs can be embedded in the same network element. Multiple occurrences or instances of the service function can exist in the same domain. In one embodiment, of the SFs 117C may be third party service nodes that implement certain functions for a value added service function chain. Examples of SFs include, but are not limited to, firewalls, wide area networks (WANs) and application acceleration, deep packet inspection (DPI), lawful interception (LI), server load balancing, network address translation (NAT)-44, NAT-64, Internet Protocol version 6 network prefix translation (NPTv6), HOST_ID injection, hypertext transfer protocol (HTTP) header enrichment functions, and transmission control protocol (TCP) optimization.

The boundary node 121 may be the entry and exit point for traffic coming from an external network, such as the mobile network 110, to the SFC network 105 and for traffic going from the SFC network 105 to the mobile network 110. For example, in the upstream direction, a boundary node 121 can receive encrypted traffic that originated from a mobile network subscriber's client device 112 and that is egressing the mobile network 110, e.g., through PGW 114 or any other network element. The boundary node 121, with access to decryption information such as SSL/TLS private keys, is able to decrypt the traffic, establish a secure (SSL/TLS) session with the client device 112, and then perform certain value-added-services on traffic from the client device 112. The traffic then proceeds to a content provider origin in the network 107, or is returned to the mobile network 110 and/or the client device 112, depending on the particular function. The SFC network 105 can likewise perform value-added services on downstream traffic headed to the client device 112, encrypting it in the session before sending it through the gateway to the client device 112. A description of mobile network 110 is found below.

It is appreciated that one or more boundary nodes 121 may exist, and that system 100 is not limited to a single edge or boundary node as the source of ingress and egress between networks.

Any of the nodes, e.g., SFC classifier node 117A, SFF 117B, SF 117C and boundary node 121, may be a device which includes, a processor 119A, a memory 1198 and a communication interface 119C. The processor 119A is operative to perform processing functions including encryption, decryption, authentication tag creation and authentication and updating NSH data and tables, as described below. The memory 1198 is operative to store data used by the processor 119. The communication interface 119C is operative to send and/or receive network packets, tickets, keys, encryption algorithms, authentication tag generation algorithms and authentication algorithms and any other data (none of which are shown).

Mobile network 110 includes conventional mobile network components, such as a PDN Gateway (PGW) 114, which serves as the anchor point for user-equipment (also referred to herein as user equipment 112) sessions towards the data packet network and manages policy enforcement features. A mobile management entity (MME) 116 for tracking the user equipment 112 and facilitating voice and data sessions, and a serving gateway (SGW) 118 to manage user-plane mobility are coupled to the base station 120. Also included in the mobile network 110 are Home Subscriber Server (HSS) 122 for maintaining a subscriber database needed by other network elements, and a Policy & Charging Rules Function (PCRF) for maintaining policy and charging rules, including subscriber information (such as account data and services the subscriber has signed up for), and bearer and QoS information associated with end-points within the operator network. In the systems and methods described herein, these components function in a conventional manner, as modified by the teachings herein.

Interfaces from the PGW 114 to the network 107 and from PGW 114 to the SFC network 105, via the boundary node 121, are also disclosed. These interfaces may be, for example, LAN connections such as an S(Gi) interface. However, the particular network configuration and interfaces are non-limiting examples. It should also be appreciated that while the diagram depicts an SFC network 105 external to the mobile network 110, the mobile network 110 may also include deployment of the SFC network 105 into the mobile network 110. Moreover, it is appreciated that the SFC network 105 may be machines deployed throughout the network 107, such as the Internet.

Figure 2:
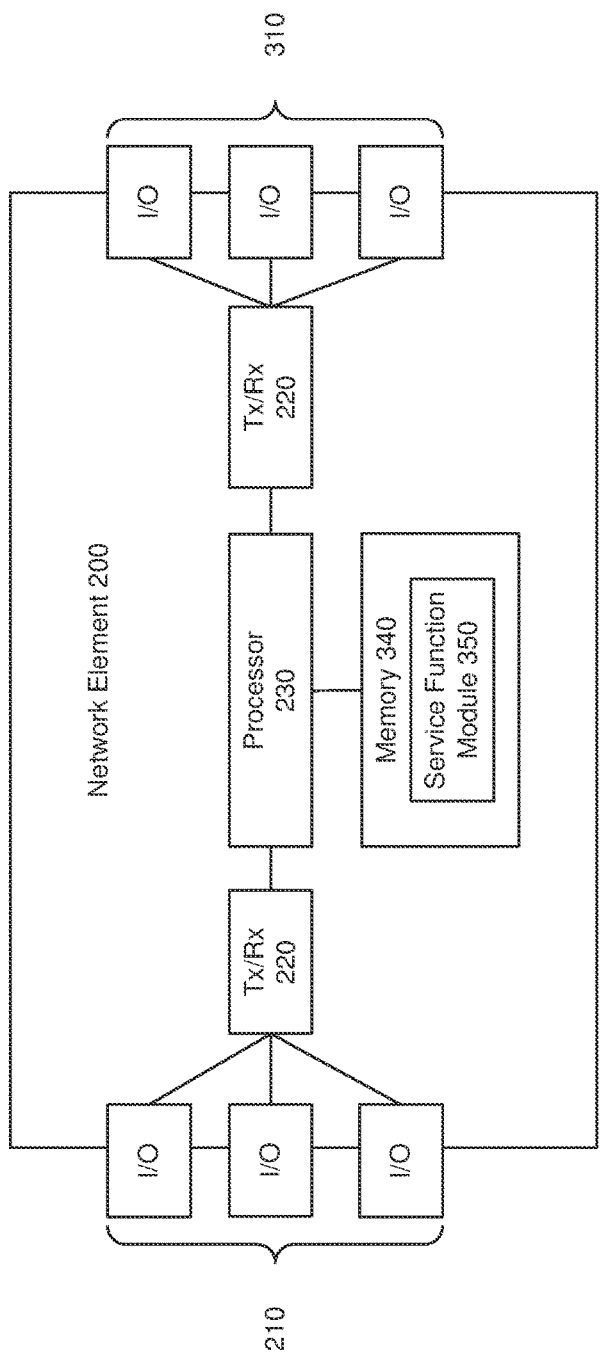
FIG. 2 is an example diagram of a network element within the service function chain and mobile networks of FIG. 1.

FIG. 2 is an example diagram of a network element within the service function chain and mobile networks of FIG. 1. The network element (or node) 200 may be suitable for implementing the disclosed embodiments. Network element 200 may be any device (e.g., a modem, a switch, router, bridge, server, client, controller, etc.) that transports or assists with transporting data through a network, system, and/or domain. For example, network element 200 may be implemented in any of the nodes illustrated in FIG. 1, such as SFC classifier 117A, SFF 117B, SF 117C and boundary node 121. Network element 200 comprises I/O ports 210, transceivers (Tx/Rx) 220, a processor 230, and a memory 240 having a service function module 250. I/O Ports 210 are coupled to Tx/Rx 220, which may be transmitters, receivers, or combinations thereof. The Tx/Rx 220 may transmit and receive data via the I/O ports 210. Processor 230 is configured to process data, and memory 240 is configured to store data and instructions for implementing embodiments described herein. The network element 200 may also comprise electrical-to-optical (EO) components and optical-to-electrical (OE) components coupled to the I/O ports 210 and Tx/Rx 220 for receiving and transmitting electrical signals and optical signals.

The processor 230 may be implemented by hardware and/or software. In one embodiment, the processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the I/O ports 210, Tx/Rx 220, and memory 240.

The memory 240 may include one or more of disks, tape drives and/or solid-state drives and may be used as an over-flow data storage device, to store programs when such programs are selected for execution, and to store instructions and data that are read during program execution. The memory 240 may be volatile and non-volatile and may be read-only memory (ROM), random-access memory (RAM), ternary content-addressable memory (TCAM), and static random-access memory (SRAM). Service function module 250 is implemented by processor 230 to execute the instructions for implementing various embodiments for routing and forwarding data packets along different SFPs and forwarding paths based on SFP information, generating SFP entries based on the SFP information, generating steering policies based on the SFP information, and generating local or internal forwarding policies. Alternatively, service function module 250 is implemented as instructions stored in the processor 230.

Figure 3:
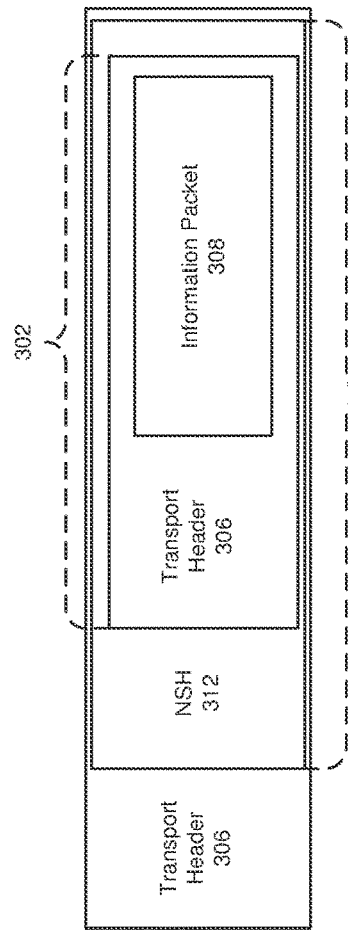
FIG. 3 illustrates an example of a network service header packet structure.

FIG. 3 illustrates an example of a network service header packet structure. In order to direct traffic inside of a SFC-enabled domain, such as SFC-enabled domain 117 (FIG. 1), the Internet Engineering Task Force (IETF) has standardized a header, called the Network Service Header (NSH). The NSH encapsulates packets as set forth in IETF RFC 8300 "Network Service Header (NSH)," which is hereby incorporated by reference. Directing the traffic inside of the SFC-enabled domain 117 is performed as set forth in RFC 7665 "Service Function Chaining (SFC) Architecture," which is also incorporated by reference. As explained in the IETF specification, an NSH is imposed on a packet (or frame), and contains service path information and, optionally, metadata that are added to the packet and used to create a service plane. Subsequently, an outer transport encapsulation is imposed on the NSH, which is used for network forwarding. A service classifier, such as SFC classifier 117A, adds the NSH to the packet when entering the SFC-enabled domain 117. The NSH is removed by the last SFF, such as SFF 117B, in the service chain or by an SF, such as SF 117C, that consumes the packet.

More specifically, and as illustrated, a packet 302 may include a transport header 306 and an information packet 308. The transport header 306 may include, for example, addressing and/or other control information related to the transport layer of the Open Systems Interconnection (OSI) network layer model. For example, the transport header 306 may be an Internet Protocol version 4 (IPv4) or Internet Protocol version 6 (IPv6) header. The information packet 308 may include, for example, the data that comprises a payload. As packet 302 progresses through a network, the packet 302 can be encapsulated using an NSH 312. The encapsulation is typically performed at a classifying node, such as the SFC classifier 117A, which thereby results in an encapsulated packet 304 as shown in FIG. 3. The NSH 312 provides a variety of facilities for controlling and monitoring the progress of the packet through succeeding nodes (e.g., SFFs and SFs) until, at some later node, the packet is de-capsulated, removing the NSH 312 and returning the packet 302.

An example of a packet 302 progressing through a network may be found with reference to FIG. 4 below and the discussion that follows. A detailed discussion of NSH 312 may be found with reference to FIG. 5 below.

Figure 4:
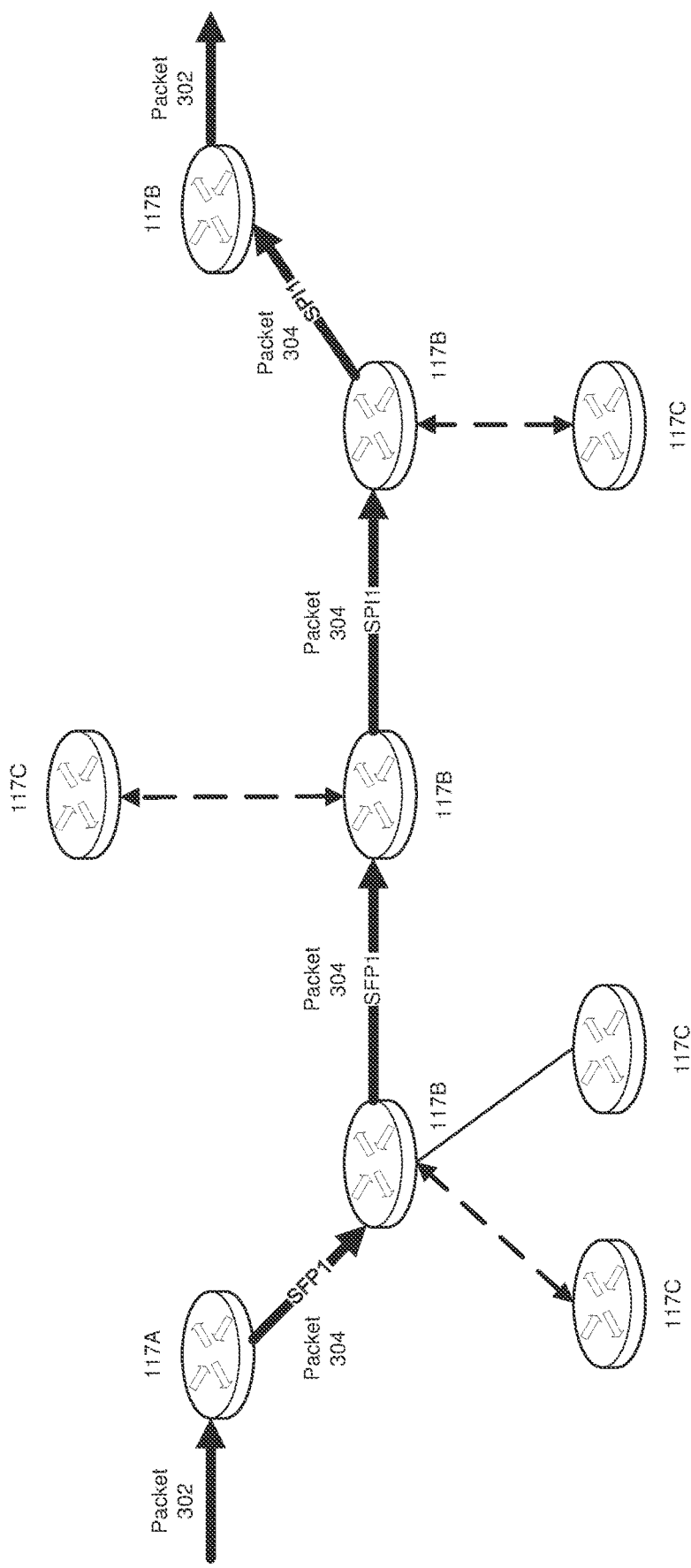
FIG. 4 illustrates an example of a packet being forwarded along service function paths.

FIG. 4 illustrates an example of a packet being forwarded along service function paths. The network 400, for example SFC-enabled domain 117 (FIG. 1), comprises an ingress node, such as SFC classifier 117A, and network nodes, such as SFFs 117B and/or SFs 117C. In one embodiment, an SFF 117B node may also be an egress node from which the data packets are de-capsulated and exit the network 400. It is appreciated that network 400 may be configured as shown or in any other configuration that includes any number of network nodes, including ingress and egress nodes.

The SFC classifier 117A node is configured as a SFC or SFP ingress node (also known as a head-end of the SFP) that inserts an SPI in into the NSH 312 and encapsulates packet 302 with the NSH 312 to form encapsulated NSH packet 304 (FIG. 3). In one embodiment, the SFC classifier node 117A is an SFF 117B node.

The SFF 117B nodes may comprise one or more ports and one or more SFs 117C attached to each of the ports. A port that is attached to an SF 117C refers to a port of an SFF 117B network node that is physically coupled to an SF 117C, configured to be coupled to an SF 117C, associated with an SF 117C, or configured to interact with an SF 117C. SFF 117B network nodes are configured to forward data packets, such as data packets encapsulated with NSH 312 (i.e., encapsulated packet 304, FIG. 3), to the attached SFs 117C and to other network nodes.

SFF 117B network nodes are configured to communicate the NSH encapsulated packets 304 through network 400. As noted above, an SFF 117B network node at the end of an SFC or SFP is an egress node or a tail-end of the SFP.

The SFC classifier 117A network node, SFF 117B network nodes and SF 117C network nodes may be coupled to one another via one or more tunnels and/or links. Examples of tunnels include, but are not limited to, multiprotocol label switching (MPLS) tunnels and virtual extensible local area network (VxLAN) tunnels. Links may include physical links, such as electrical and/or optical links, and/or logical links (e.g., virtual links).

In the depicted example, an incoming packet 302 (FIG. 3) or frame enters the service chaining domain, such as SFC-enabled domain 117, from mobile network 110 or network 107 (FIG. 1). The packet 302 enters the SFC-enabled domain 117 via an ingress node (e.g., SFC classifier 117A) and exits the service domain via an egress node (e.g., SFF 117B). Although the depicted example shows a single ingress node and a single egress node, it is appreciated that there may be multiple ingress nodes and multiple egress nodes within a service domain.

The SFC classifier 117A network node, upon receipt of a packet 302 from the servicing network, encapsulates the packet 302 by adding an NSH header 312 to form the NSH packet 304 (FIG. 3). The NSH header 312 effectively directs processing of the packet at subsequent nodes and/or controls the path the packet follows. That is, the path of the encapsulated NSH packet 304 traverses the SFP of network 400 based on the NSH header 312. For example, the NSH packet 304 can be forwarded along a particular SFP, such as SFP1 represented by the solid black arrow lines. Nodes or virtual functions operating as SFFs 117B are responsible for forwarding traffic to connected SFs 117C.

When an NSH packet 304 reaches an egress node (e.g., SFF 117B), it is de-capsulated (i.e., the NSH header is removed) and the packet 302 exits the SFC-enabled domain 117.

Figure 5:
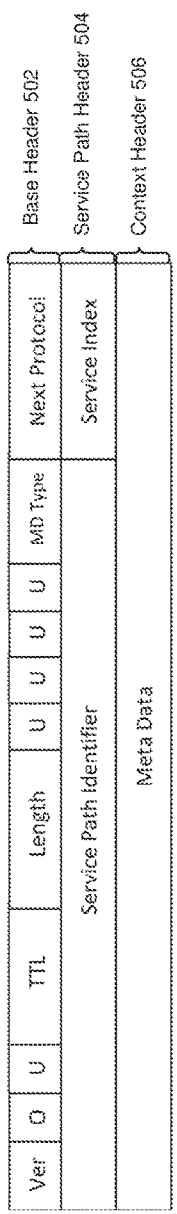
FIG. 5 illustrates a network service header format.

FIG. 5 illustrates a network service header format. A network service header (NSH) format 500 is composed of a base header 502, a service path header 504 and a context header 506, each of which may be 4-bytes, as detailed in the IETF RFC8300. The base header 502 provides information about the service header and the payload protocol, the service path header 504 provides path identification and location within a service path, and the context header 506 carries metadata (i.e., context data) along a service path (or SFP). The various fields in the NSH 500 format are defined as follows:

The "Ver" field indicates the NSH version—only version zero is currently specified or used.

The "O" field is one bit that, when having a value of one, indicates the packet is an Operation, Administration and Maintenance (OAM) packet that requires certain OAM handling.

The five fields labeled "U" are each one bit and are currently unspecified and are currently required to be sent as zero and ignored on receipt.

The "TTL" field is for loop prevention and is decremented at each node that processes NSH headers. The encapsulated packet is discarded if TTL is zero.

"Length" is the length of the NSH in units of 4-byte words.

"MD Type" is the type of the variable length Meta Data that appears at the end of the NSH.

"Next Protocol" indicates the protocol type of the information packet following the NSH or the initial part of that information packet. Typically, the transport header 306 (FIG. 3) indicates the protocol type for the information packet or the initial part of the information packet. When the NSH 312 (FIG. 3) is added, the transport header 306 is changed to indicate that the data after the transport header 306 begins with the NSH 312 and the indication of the packet content protocol type that had been in the transport header 306 before the addition of the NSH 312 is put in the "Next Protocol" field of the NSH 312. This is reversed when the packet is de-capsulated and the NSH 312 is removed, that is, the protocol type indication in the Next Protocol field of the NSH 312 being removed is put into the transport header 306.

The "Service Path Identifier" (SPI) and "Service Index" (SI) may be used in conjunction with controlling the packet's processing and path through the network. In general, the SPI uniquely identifies an SFP selection.

The SI provides a location within the SFP and is decremented at each SFF node that processes the NSH 312. The SI is used in conjunction with the SPI for determining the next SFF/SF in the path.

"Meta Data" is variable length information of the type giving by "MD Type" that can serve a variety of purposes.

Using the NSH format 500, NSH-aware nodes (which may include SFC Classifiers, SFFs and SFs) may alter the contents of the NSH format 500. The nodes may take several possible NSH-related actions including, but not limited to:

Insert or remove the NSH: These actions can occur respectively at the start and end of a service path. The SFC classifier inserts an NSH at the start of an SFP. At the end of an SFP, an SFF removes the NSH before forwarding or delivering the de-encapsulated packet.

Select service path: The service path header 504 provides service path information and is used by SFFs to determine correct service path selection. SFFs use the service path header 504 for selecting the next SF or SFF in the service path.

Update the NSH: SFFs decrement the service index (SI) by one. If an SFF receives a packet with an SPI and SI that do not correspond to a valid next hop in a valid SFP, that packet is dropped by the SFF. Classifiers may also update context headers 506 if new/updated context is available.

Service policy selection: SFs derive policy (i.e., service actions such as permit or deny) selection and enforcement from the NSH. Metadata shared in the NSH can provide a range of service-relevant information such as traffic classification.

Figure 6:
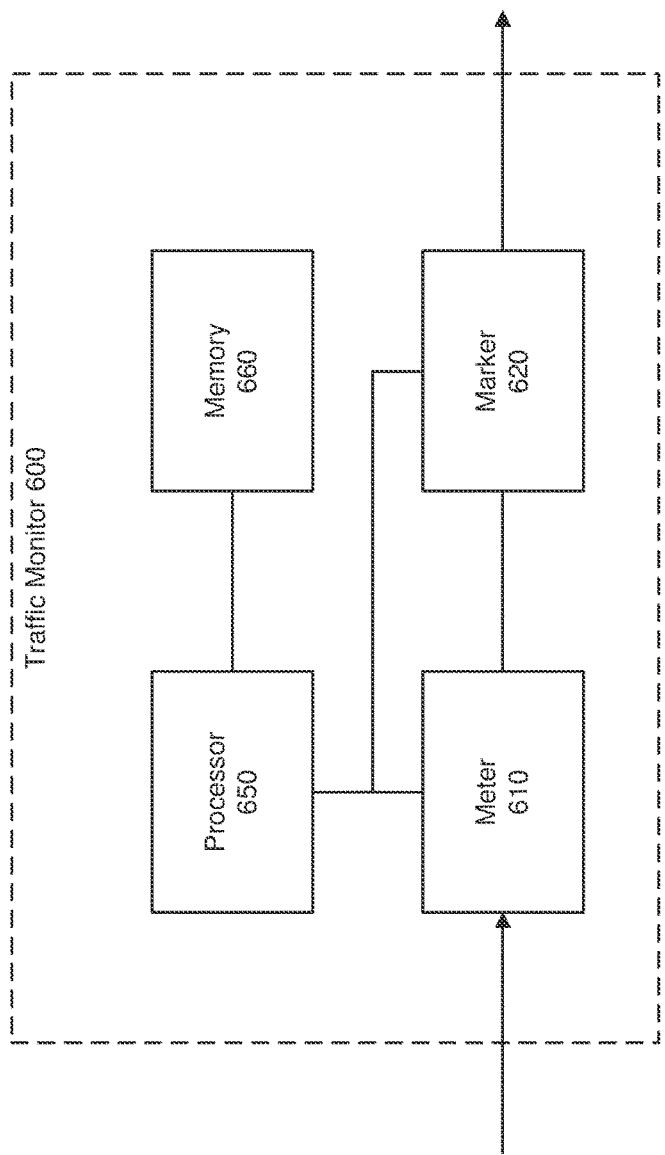
FIG. 6 illustrates an example embodiment of traffic monitoring device.

FIG. 6 illustrates an example embodiment of traffic monitoring device. As depicted, the traffic monitor (or conditioner) 600 includes, for example, a meter 610, a marker 620, a processor 650 and a memory 660. The traffic monitor 600 operates in connection with the processor 650 that receives and processes instructions from the memory 660 (or some other similar source), as appreciated.

The traffic monitor 600 traditionally meters an IP packet stream in a network and marks packets (e.g., packet 302, FIG. 3) in the stream with a "color." The metering and marking of incoming IP packet streams is useful, for example, for ingress policing of a service, where the policing policies are set, for example, by policy manager 115D (FIG. 1). In one embodiment, the traffic monitor 600 is or resides in an edge or boundary node in SFC network 105, such as boundary node 121.

A meter 610 may operate in one of two modes in order to indicate color. In a color-blind mode, the meter 610 assumes that a packet 302 entering the traffic monitor 600 is uncolored. In a color-aware mode, the meter 610 assumes that some preceding entity has pre-colored the incoming packet 302 so that each packet is a "color," for example labeled as either green, yellow, or red. This is a label, frequently encoded as one or more bits associated with the traffic in the NSH header, that can be used to affect the handling of that traffic or for traffic measurement or other purpose as defined by the network operator. In one embodiment, the color is coded in the SPI field of the packet of the NSH header 500 format, as discussed in detail below.

The marker 620 colors (or recolors) a packet according to the results of the meter 610. In policing the incoming IP packet stream, packets 302 may be marked red when exceeding a peak information rate (PIR), and otherwise marked yellow or green depending on whether a committed information rate (CIR) has been exceeded. The PIR is a burstable rate set on network a node (e.g., a router or switch), that allows throughput overhead, whereas the CIR is a committed rate speed that is guaranteed or capped. For example, a CIR of 10 Mbit/s PIR of 12 Mbit/s allows you access to 10 Mbit/s minimum speed with burst/spike control that allows a throttle of an additional 2 Mbit/s.

More specifically, IETF RFC 2697 and IETF RFC 2698 define a Single Rate Three Color Marker (srTCM) and Two Rate Three Color Marker (trTCM), respectively, which can be used as components in the traffic monitor, the contents of which are hereby incorporated by reference. IETF RFC 4115 defines a Differentiated Service Two-Rate, Three-Color Marker with Efficient Handling of in-Profile Traffic which may also be used as components in the traffic monitor, also hereby incorporated by reference.

The srTCM described in IETF RFC 2697 marks packets in an IP stream based on a traffic rate, CIR, and two different burst sizes—committed burst size (CBS) and excess burst size (EBS). Consistent with the description above, a packet is marked "green" (e.g., by marker 620) if it does not exceed CBS, "yellow" if it does exceed CBS but does not exceed EBS, and "red" if it exceeds both CBS and EBS. The srTCM is limited in that it uses the length, but not peak rate, of a burst of traffic to determine the color associated with the traffic. A service, or a level of service, is then provided to the traffic based on its color.

The trTCM described in RFC 2698 marks packets in an IP stream based on two different traffic rates, PIR, and CIR, and corresponding burst sizes CBS and PBS. According to trTCM, a packet is marked "red" if it exceeds PIR, and if the packet does not exceed PIR, it is marked "yellow" or "green" depending on whether it exceeds CIR or does not exceed CIR. By making use of two rates, a peak traffic rate (or simply, peak rate), and a committed rate, trTCM is able to monitor peak rate traffic separate from committed rate traffic.

Both srTCM and trTCM may use a metering device that meters each packet in a traffic stream and forwards, or passes, the packet to a marker, such as marker 610, that pre-colors the packet. The details of the pre-coloring process and how the meter detects or determines the color of a packet is implementation specific and outside the scope of the RFCs as well as this document. The RFCs disclose the marker recoloring a packet based on the results of the meter, and provides, as an example, coding the color as a codepoint in the DiffServ (DS) field of the packet in a per-hop behavior (PHB) specific manner, and refers one to IETF RFC 2474 for further information. The color can also be coded as a drop precedence of the packet, according to RFC 2597.

It is appreciated that while the referenced RFCs describe color rate marker algorithms in the context of an Internet Protocol (IP)-based packet switched network, such algorithms may also be implemented in communications networks, such as cell-switched networks as well.

In one example embodiment of marking color, the identified color of an incoming packet 302 may be used to control the action of nodes (e.g., SFFs 117B or SFs 117C) that process an NSH header 312 as it traverses the network, such as SFC network 105. Actions taken by the nodes are configurable and may include, for example, a node processing the packet with higher or lower priority, a node processing the packet that would not have been otherwise processed, or a node omitting processing of the packet that would have otherwise been processed. The ability to perform these actions (or similar actions) might be helpful for a carrier in satisfying, for example, service level agreements (SLAs) by coloring traffic based on customer class.

In a second example embodiment of marking color, the indicated color may be used to specify traffic that exceeds a quota allowed for a particular customer or class of customers. For example, traffic for a customer during a time period could initially be set to one color, and when the cumulative traffic for the customer during the time period exceeds the quota, subsequent traffic during that time period may be assigned a different color (until the quota is renewed at the end of the time period). In another example, a running average traffic rate could be maintained and the color marking based on whether the rate falls below or above a customer purchased rate. In still another example, two or more colors may indicate traffic within the quota, traffic somewhat above quota, or traffic extremely above quota.

In a third example embodiment of marking color, traffic color may be set to a value that changes every N packets in a flow, where a "flow" is defined as all or an subset of the packets that are set to pass through a particular node in the service path. Assuming the processing of the packets along the path is supposed to maintain the number of packets in the flow, or is supposed to discard or spawn a certain number of packets in the flow, then the later (subsequent) node may count the number of packets with each color. Any deviation in the number of received packets from the expected number of packets may be reported. The subsequent node receiving the packet may also detect delayed or out-of-order packets, where a packet with a particular color is received after a packet is sent with a subsequently transmitted color.

In one embodiment, when sufficient colors are available (i.e. sufficient bits are available to indicate color in the packet header), color could be used for different purposes simultaneously. This may be accomplished, for example, by encoding multiple bits to include any one or more of the above examples.

Figures 7, 8A:
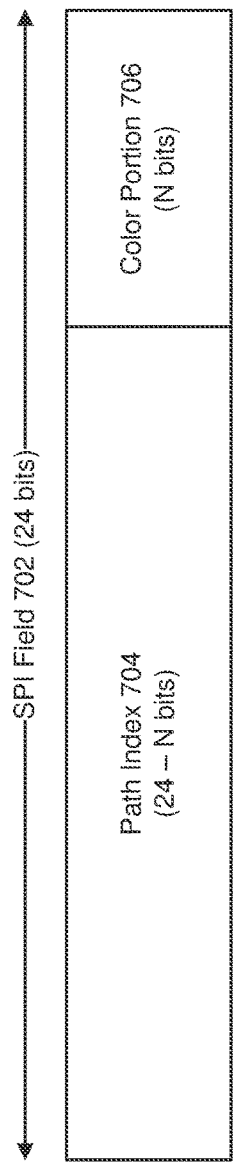
FIG. 7 illustrates a service path identifier field of a service path header of FIG. 5.
FIG. 8A illustrates an example forwarding information base table for a service function forwarder.

FIG. 7 illustrates a service path identifier field of a service path header of FIG. 5. In one embodiment, the service path identifier (SPI) field 702 may be employed as a mechanism to indicate the color of traffic in the NSH format 500 (FIG. 5). Unlike conventional mechanisms, the SPI field 702 allows for an indication of color (traffic) without using any of the undefined ("U") bits in the NSH format 500 and without changing any of the other fields (e.g., fields in the base header or context header fields) in the NSH format 500.

In the depicted embodiment, the SPI field 702 includes two fields—a path index (PI) 704 that effectively identifies the path of an NSH encapsulated packet 304, and a color portion 706 (also referred to herein as a treatment index) that includes bits reserved for allocating the color of traffic on the path of the NSH encapsulated packet 304. As described above, the color of traffic may be pre-colored (i.e., the color may be pre-set) or colored (or recolored) by the ingress node when entering a particular SFC-enabled domain. In this case, the coloring (or recoloring) may be based on the results of metering the packet received as the ingress node, as detailed above.

As illustrated, the SPI field 702 comprises 24-bits that may be allocated between the PI 704 and the color portion 706. The 24-bits in the SPI 702 field is a set number that is prescribed by the service path header 504 in the NSH format 500 as dictated by RFC 8300. For example, a low order number of bits may be used in the SPI field 702 to indicate the color of the traffic, and the higher order of bits may be used in the SPI field 702 to identify a service path of the NSH encapsulated packet 304. The low order number of bits is identified as the color portion 706 and comprises N bits. The high order of bits is identified as the PI 704 and comprises (24−N) bits. Accordingly, if N bits (e.g., N low order bits) are used to indicate the color of the traffic along a service path, then (24 bits-N) bits remain for use in the PI 704 to identify the service path itself.

Although not depicted, in one embodiment, the service index (SI) field may also be employed as a mechanism to indicate color in the NSH format 500. The SI field comprises 8-bits that may be allocated between the SI bits and bits that indicate the color of traffic for a packet. The 8-bits in the SI field is a set number that is prescribed by the service path header 504 in the NSH format 500 as dictated by RF 8300. Operationally, the bits in the SI field may be set in a manner similar to those in the SPI embodiment described above.

In one embodiment, the SPI 702 and SI fields may together be employed as a mechanism to indicate color in the NSH format 500.

In either the SPI or SI embodiment, the color of traffic can be indicated by one or more bits in a fixed position of the SPI or SI field. In one embodiment, using the SPI field 702, any of the 24-bits in the field may be utilized to indicate the color of traffic. In another embodiment, using the SI field (FIG. 5), any of the 8-bits in the field may be utilized to indicate the color of traffic. Bits not used to identify the color of traffic may be used to indicate the SI. Whether employing SPI or SI, any number of high order bits, any number of low order bits, or any number of scattered bits may be used.

A node that has received a packet 302, processes the packet according to the NSH header 312. In particular, forwarding the packets may be achieved at the service plane layer using the NSH header 312. The SPI 702 and SI are used for this purpose. More specifically, a unique SPI is used to identify a given service path instantiation of a service chain, and the SI is initialized to 255 or some number between 255 and the total number of SFs and SFF to SFF hops within the service chain, and decremented at each service hop as packets (or frames) travel along the service path.

In one example, and with reference to FIG. 1, each NSH based forwarding node (e.g., SFC classifier 117A or SFF 117B) in the SFC-enabled domain 117 may include a forwarding table (also referred to as a path table) that is responsible for associating content of an incoming packet with corresponding ports or faces (for next hops) on which the packets may be received and forwarded. As discussed below with reference to FIGS. 8A and 8B, the forwarding table may include, among other fields, the SPI 702, service index (SI), and/or a color portion (or treatment index).

In one embodiment, for every n different number of colors used to indicate the traffic in the NSH header 312, there are n SPI 702 entries and a corresponding n SI entries in the FIB for each service path. On the contrary, when the color of traffic is not included in the table, a single SPI 702 and corresponding service index (SI) entry may be used for each service path. Any additional information used to implement the color of traffic may be included in the path lookup table since the color can be determined based on the color portion 706 of the SPI 702.

In one other embodiment, a separate table indexed by color (treatment index) may be accessed or evaluated to determine the treatment of packets based on their color. In this embodiment, each of the SFFs 1178 are configured to interpret the number of lower most bits of the SPI 702 that indicate color. Additionally, a specific color has a corresponding quality of service treatment as specified in the separate table regardless of the higher most bits in the SPI 702. In this case, the forwarding table may be based on the higher most bits of the SPI 702 (excluding the color bits) and the SI, and a separate column in the forwarding table may identify a color to indicate the quality of service treatment, as discussed further below.

FIG. 8A illustrates an example forwarding table for a service function forwarder. The forwarding table 800A may be stored in a network node, such as SFF 117B. As illustrated, the forwarding table 800A includes, among other fields, the SPI 702 and SI 802. The SPI 702 may be divided into two fields—a path index (PI) 704 and a color portion 706 (or treatment index), as discussed with reference to FIG. 7 above. As appreciated, the SPI 702 need not be divided into two fields, but may also use bits in any random or fixed position or be divided into more than two fields within the SPI 702. Additionally, various other fields, such as output port, output encapsulation, destination address, decapsulation flag, etc. may also be included in forwarding table 800A, but are not a focus of this document.

In the depicted embodiment, we assume for purposes of discussion that the SPI 702 has been divided into two fields—the PI 704 and color portion 706. In this example, the lower most two bits of the SPI field 702 are used to mark the color of traffic for an incoming NSH encapsulated packet 304. In general N is the number of bits in the color portion 706 as shown in FIG. 7. These bits are set in the color portion 706, where N=2 in this example. With N=2 in the color portion 706, the PI 704 has 22 bits (e.g., (24−N)=22) in which to identify the service path.

In one embodiment, and continuing with the example above, colors to indicate traffic for a specific service path may be set using the lower most two bits. Setting the lower most two bits, NSH encapsulated packets 304 in the incoming packet stream may use color to identify different levels of services. For example, and as shown in Table I below, when N=2 the lower most two bits may be set to identify the color of traffic on a service path. For example, when the lower most two bits are set in a network node, up to 4 different colors (when all values are used) may be used for any one service path.

TABLE I

| Bits 23 - 2 | Bit 1 | Bit 0 | Color |
|---|---|---|---|
| Path A | 0 | 0 | Green (0) |
| Path A | 0 | 1 | Yellow (1) |
| Path A | 1 | 0 | Red (2) |
| Path A | 1 | 1 | [empty] (3) |

For example, green packets may indicate a guaranteed delivery for a packet, or at least guarantee forwarding of the packet with a low probability of being discarded or dropped, while yellow packets may indicate a packet will be forwarded on a best effort basis, and red packets are discarded or dropped. Other colors, and services associated with those colors, may also be added and may vary depending on the number of color portion 706 bits that are being used in the SPI 702.

In one embodiment, if less than the total number of allowable colors are used for a specific path, entries may be removed or omitted. For example, as shown in Table I, the color associated with Path A when the lower most two bits are set to "1" is empty. In such as case, the forwarding table 800A may indicate that the color is not being used (e.g., "empty") or the entire entry may be removed or omitted from the forwarding table 800A. As noted above, the number of bits in the SPI 702 used to identify color is not limited to the lower most two bits. Any number of bits (N bits) in the SPI 702 may be utilized for this purpose.

Continuing with the example in FIG. 8A, a unique SPI 702 is used to identify a specific service path instantiation of a service chain. As explained, the SPI 702 is divided into the PI 704 and the color portion 706. The service index (SI) 802 is initialized to a value indicative of services within the service chain for each instantiation of an SPI 702, such that it may be decremented based on how a packet is handled at a particular network node in the SFC. As illustrated, table 800A identifies two PIs 704 (e.g., Path A and Path B) with associated color markings ("0"-"3"), represented by color portion 706, and an SI 802 (e.g., 'k' or 'm').

Table 800A may be stored, for example, as the forwarding table of a network node, such as SFF 117B. During implementation, when an NSH encapsulated packet 304 (FIG. 3) arrives at a network node, the SPI 702 and SI 802 are looked up in the forwarding table 800A. The information in the forwarding table 800A determines, among other things, which port the NSH encapsulated packet 304 will be to forwarded out of, the destination address to forward it to, and whether to either (1) decapsulate the NSH encapsulated packet 304 by removing the NSH header 312 or (2) retain the NSH header 312 and forward the NSH encapsulated packet 304 with a specific output encapsulation indicated by an outer transport header. If the packet is forwarded with the NSH header 312 as an NSH encapsulated packet 304, the SI 802 is decremented.

These "colors" may then be used to differentiate services that determine how a packet is treated by the network. More specifically, dependent upon the color as indicated in the color portion 706 for each PI 704, the NSH encapsulated packet 304 may be handled differently. As described above with reference to FIG. 1, a policy manager 115D may be responsible for setting various QoS treatments for incoming packets, where the QoS is defined through the coloring of the NSH encapsulated packet 304 for a given data flow or service path. For example, by interfacing with policy manager 115D, an administrator may define a QoS policy whereby VoIP packets for Path A are colored "green" for high forwarding priority (for example allocating 60% of the network bandwidth) and FTP packets for Path B are colored "yellow" for low forwarding priority (for example allocating 20% of the network bandwidth).

FIG. 8B illustrates another example of a forwarding table for a service function forwarder. The forwarding table 800B is stored in a network node, such as an SFF 117B. In one embodiment, the forwarding table 800B is widened or extended (e.g., an extra column is added) to include n bits to indicate a color 804 (treatment index) that corresponds to each SPI 702 and SI 802. For example, and as illustrated, SPI 702 entry A1 has an SI 802 of 'k' and a corresponding color 804 that is "red."

In one other embodiment, the number of forwarding table entries increases by an amount dependent on the number of differently colored paths being used, where a color of "zero" (or empty field) indicates operation in an uncolored mode. For example, two color paths (e.g., red and green) are used for path entries A1 and A2, and four color paths (e.g., red, blue, purple and empty (0)) are used for path entries are used for paths B1-B4.

Unlike the forwarding table 800A (FIG. 8A), the SPI 702 in the NSH header 312 does not provide a direct indication of the color of traffic (since no "color portion" bits are used in the SPI or any other field). Accordingly, the received packet (i.e., NSH encapsulated packet 304) cannot be used to directly determine a color associated with the service path. Instead, the forwarding table 800B is responsible for the identification of a specific packet color upon arrival. For example, when an NSH encapsulated packet 304 is received at an NSH-enabled network node, the SPI 702 and SI 802 are looked up in the forwarding table 800B. When an entry exists for the SPI 702, the corresponding color 804 is also obtained from the forwarding table 800B. The received packet may then be treated according to the services or service level associated with the color, as explained above. In one embodiment, if the SPI is not in the forwarding table, the packet should be discarded.

Figure 9:
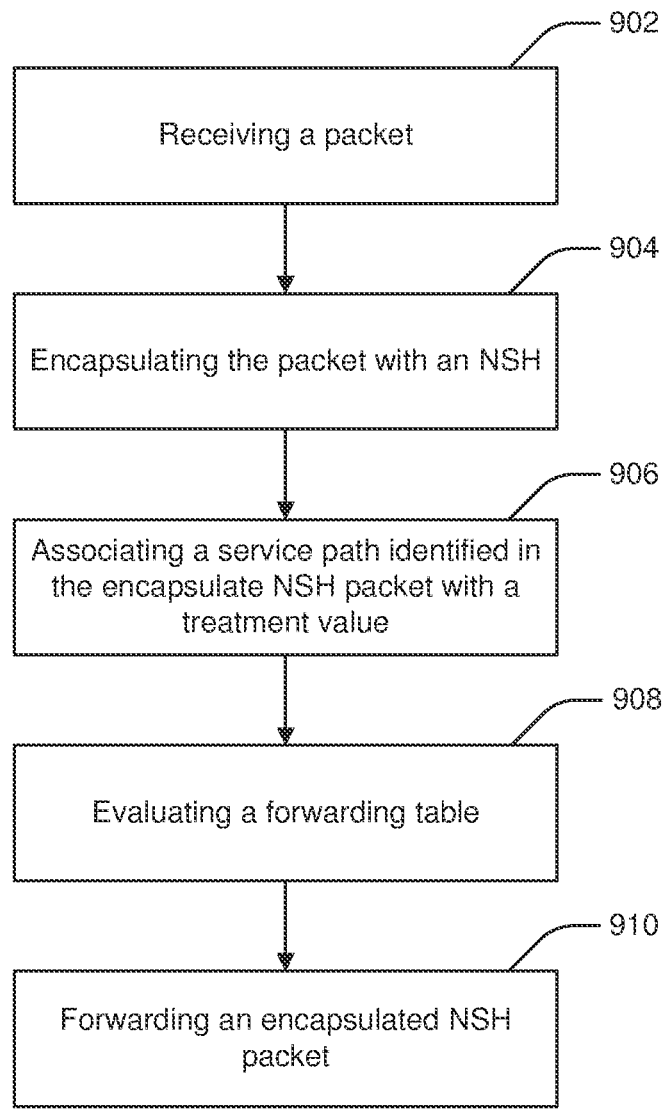
FIG. 9 illustrates a flow diagram of forwarding a packet in a service function chain of a network of FIG. 1.

FIG. 9 illustrates a flow diagram of forwarding a packet in a service function chain of a network of FIG. 1. For purposes of discussion, the process described in the depicted embodiment is implemented by a network node in the service function chain (SFC). However, it is appreciated that implementation is not limited to a network node in the SFC and that any component or node in the network may implement the process.

At step 902, the network node receives a packet belonging to the SFC of an SFC-enable domain. In one embodiment, the network node is an SFC classifier node 117A.

At step 904, the received packet is encapsulated by a network service header (NSH). In one embodiment, the packet is encapsulated by the NSH to form an encapsulated NSH packet 304 by an SFC classifier node, such as SFC classifier 117A. In another embodiment, the encapsulated NSH packet includes a service path header that identifies a service path. The service path may be identified by a service path identifier (SPI) 702.

At step 906, the service path is associated with a treatment value in the encapsulated NSH packet. In one embodiment, the SPI is divided into two portions-a path index (PI) that identifies the service path and a color portion (or treatment index) that associates the encapsulated NSH packet with a treatment value indicative of a quality of service treatment. In another embodiment, the service path header includes the SPI 702 and a service index (SI), where the SI associates the encapsulated NSH packet with a treatment value indicative of a quality of service treatment. The treatment value, for example, may direct one or more subsequent network nodes in SFC-enabled domain to treat the encapsulated NSH packet with the quality of service treatment.

At step 908, a forwarding table stored in the network node is evaluated to identify the service path and the treatment value of the encapsulated NSH packet. For example, the forwarding table, such as forwarding table 800A or 800B, is "looked up" or evaluated to identify information about the encapsulated NSH packet received at the node. In one embodiment, the quality of service treatment of the encapsulated NSH packet may be determined. The quality of service treatment may, for example, instruct subsequent network nodes how to handle the encapsulated NSH packet. For example, the quality of service treatment may identify which services or policies should be performed by the one or more subsequent network nodes.

At step 910, the encapsulated NSH packet is forwarded to the one or more subsequent nodes based on the service path indicated in the forwarding table and in accordance with the quality of service treatment corresponding to the treatment value identified in the forwarding table.

Figure 10:
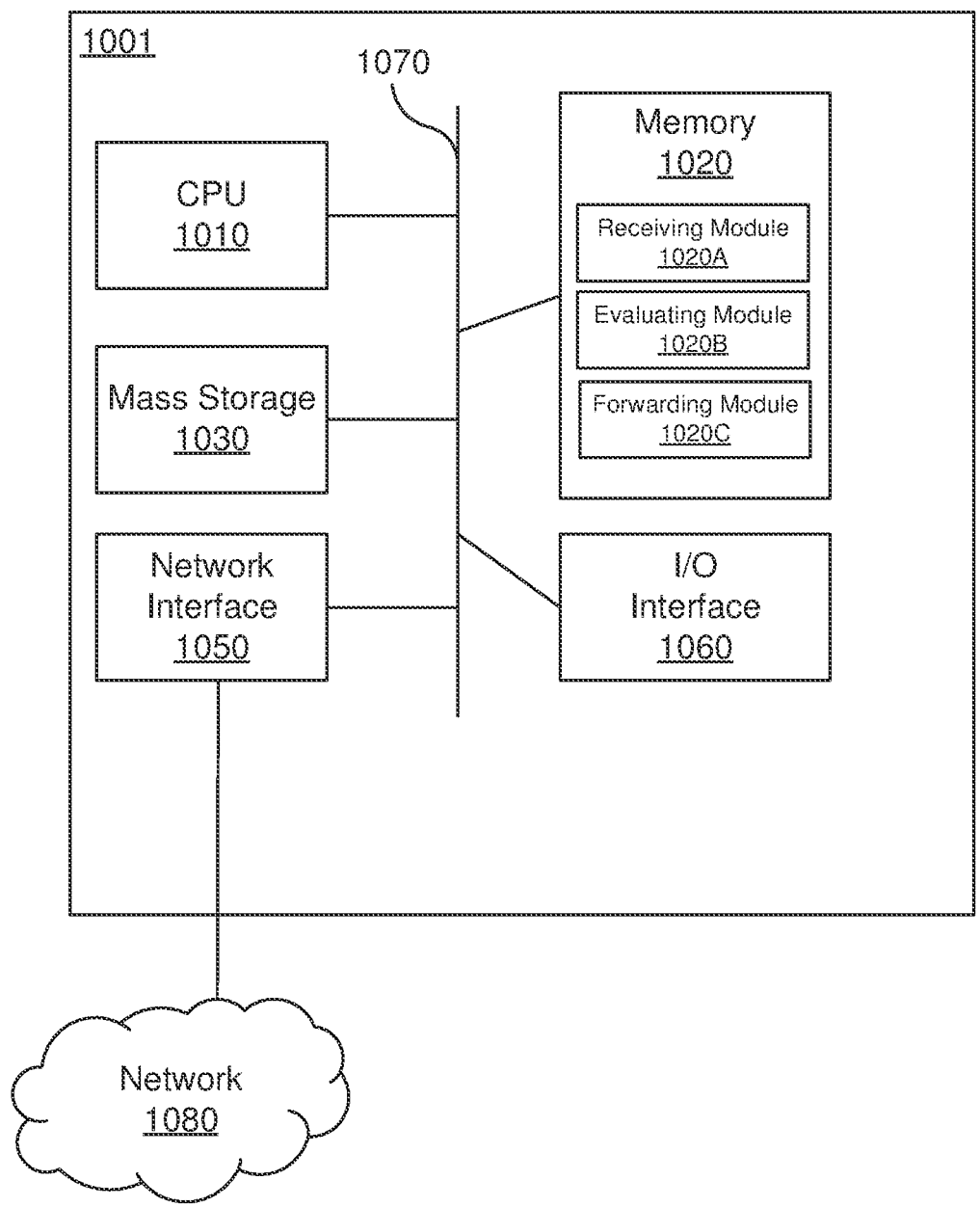
FIG. 10 is a block diagram of a network processing device 801 that can be used to implement various embodiments in accordance with the present technology.

FIG. 10 is a block diagram of a network processing device 1001 that can be used to implement various embodiments in accordance with the present technology. Specific network processing devices may utilize all of the components shown, or only a subset of the components, and levels of integration may vary from device to device. Furthermore, the network processing device 1001 may contain multiple instances of a component, such as multiple processing units, processors, memories, transmitters, receivers, etc. The network processing device 1001 may be equipped with one or more input/output devices, such as network interfaces, storage interfaces, and the like. The processing unit 1001 may include a central processing unit (CPU) 1010, a memory 1020, a mass storage device 1030, and an I/O interface 1060 connected to a bus 1070. The bus 1070 may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. In one embodiment, the memory 1020 includes a receiving module 1020A receiving the packet at a node belonging to a service function chain (SFC) in the network, wherein the packet is encapsulated by a network service header (NSH) comprising a service path header that identifies a service path, and the service path is associated with a treatment value that directs one or more subsequent nodes within the network to treat the encapsulated NSH packet with a quality of service treatment, a evaluating module 1020B evaluating a forwarding table stored in the node to identify the service path and the treatment value of the encapsulated NSH packet and determining the quality of service treatment of the encapsulated NSH packet to be performed by the one or more subsequent nodes, a forwarding module 1020C forwarding the encapsulated NSH packet to the one or more subsequent nodes based on the service path indicated in the forwarding table and in accordance with the quality of service treatment corresponding to the treatment value identified in the forwarding table.

The mass storage device 1030 may comprise any type of storage device configured to store data, programs, and other information and to make the data, programs, and other information accessible via the bus 1070. The mass storage device 830 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method in a node that includes a processor and memory with instructions for forwarding a packet in a network, comprising:

receiving the packet at the node belonging to a service function chain (SFC) in the network, wherein:

the packet is encapsulated by a network service header (NSH) that includes a service path header that identifies a service path, and directing one or more subsequent nodes within the network to treat the encapsulated NSH packet with a quality of service treatment based on a treatment value corresponding to the service path;

evaluating a forwarding table stored in the node to identify the service path and the treatment value of the encapsulated NSH packet and determining the quality of service treatment of the encapsulated NSH packet to be performed by the one or more subsequent nodes; and forwarding the encapsulated NSH packet to the one or more subsequent nodes based on the service path indicated in the forwarding table and in accordance with the quality of service treatment corresponding to the treatment value identified in the forwarding table.

2. The computer-implemented method of claim 1, wherein the service path header includes a service path identifier (SPI) comprising a path index (PI) indicating the service path and a treatment index indicating the treatment value, and a service index (SI) indicating a location of the encapsulate NSH packet in the SFC, and the treatment value indicates the quality of service treatment for the encapsulated NSH packet.

3. The computer-implemented method of claim 2, wherein the SPI comprises an upper most one or more bits of the service path header and the SI comprises a lower most one or more bits of the service path header, the total number of the upper most one or more bits is 24, the total number of the lower most one or more bits is 8, and the total number of one or more bits comprising the service path header is 32.

4. The computer-implemented method of claim 2, wherein the treatment index comprises N one or more bits of the SPI, and the PI comprises (24−N) one or more bits of the SPI.

5. The computer-implemented method of claim 3, wherein
the one or more bits comprising the PI are in a fixed position of the upper most one or more bits in the SPI, and the one or more bits comprising treatment index are a fixed position in the lower most one or more bits of the SPI, or
the one or more bits of the PI and the treatment index are randomly positioned in the SPI.

6. The computer-implemented method of claim 1, wherein the forwarding table includes n entries for each service path of the encapsulated NSH packet, where n is a number of different treatment values associated with the service path.

7. The computer-implemented method of claim 2, wherein
the service path header includes the service index (SI) indicating the treatment value and a location of the packet in the service chain, and
the treatment value indicates the quality of service treatment for the encapsulated NSH packet.

8. The computer-implemented method of claim 1, wherein
the forwarding table comprises a service path identifier (SPI) indicating the service path, a service index (SI) indicating a location of the encapsulate NSH packet in the service chain, and a treatment index indicating the treatment value, and
the treatment value indicates the quality of service treatment for the encapsulated NSH packet.

9. The computer-implemented method of claim 1, wherein the network is an SFC-enabled domain.

10. The computer-implemented method of claim 1, further comprising processing the encapsulated NSH packet according to a service function associated with the node.

11. The computer-implemented method of claim 1, further comprising decapsulating the encapsulated NSH packet by removing the NSH, and forwarding the decapsulated packet towards a destination address determined in accordance with information in the header of the decapsulated packet.

12. A non-transitory computer-readable medium storing computer instructions for forwarding a packet in a network, that when executed by one or more processors, cause the one or more processors to perform the steps of:
receiving the packet at a node belonging to a service function chain (SFC) in the network, wherein
the packet is encapsulated by a network service header (NSH) that includes a service path header that identifies a service path, and
directing one or more subsequent nodes within the network to treat the encapsulated NSH packet with a quality of service treatment based on a treatment value corresponding to the service path;
evaluating a forwarding table stored in the node to identify the service path and the treatment value of the encapsulated NSH packet and determining the quality of service treatment of the encapsulated NSH packet to be performed by the one or more subsequent nodes; and
forwarding the encapsulated NSH packet to the one or more subsequent nodes based on the service path indicated in the forwarding table and in accordance with the quality of service treatment corresponding to the treatment value identified in the forwarding table.

13. The non-transitory computer-readable medium of claim 12, wherein
the service path header includes a service path identifier (SPI) comprising a path index (PI) indicating the service path and a treatment index indicating the treatment value, and a service index (SI) indicating a location of the encapsulate NSH packet in the SFC, and
the treatment value indicates the quality of service treatment for the encapsulated NSH packet.

14. The non-transitory computer-readable medium of claim 13, wherein the SPI comprises an upper most one or more bits of the service path header and the SI comprises a lower most one or more bits of the service path header,
the total number of the upper most one or more bits is 24,
the total number of the lower most one or more bits is 8, and
the total number of one or more bits comprising the service path header is 32.

15. The non-transitory computer-readable medium of claim 13, wherein the treatment index comprises N one or more bits of the SPI, and the PI comprises (24−N) one or more bits of the SPI.

16. The non-transitory computer-readable medium of claim 14, wherein
the one or more bits comprising the PI are in a fixed position of the upper most one or more bits in the SPI, and the one or more bits comprising treatment index are a fixed position in the lower most one or more bits of the SPI, or
the one or more bits of the PI and the treatment index are randomly positioned in the SPI.

17. The non-transitory computer-readable medium of claim 12, wherein the forwarding table includes n entries for each service path of the encapsulated NSH packet, where n is a number of different treatment values associated with the service path.

18. The non-transitory computer-readable medium of claim 13, wherein
the service path header includes the service index (SI) indicating the treatment value and a location of the packet in the service chain, and
the treatment value indicates the quality of service treatment for the encapsulated NSH packet.

19. The non-transitory computer-readable medium of claim 12, wherein
the forwarding table comprises a service path identifier (SPI) indicating the service path, a service index (SI) indicating a location of the encapsulate NSH packet in the service chain, and a treatment index indicating the treatment value, and
the treatment value indicates the quality of service treatment for the encapsulated NSH packet.

20. The non-transitory computer-readable medium of claim 12, wherein the network is an SFC-enabled domain.

21. The non-transitory computer-readable medium of claim 12, wherein the one or more processors further perform the steps of processing the encapsulated NSH packet according to a service function associated with the node.

22. The non-transitory computer-readable medium of claim 12, the one or more processors further perform the steps of decapsulating the encapsulated NSH packet by removing the NSH, and forwarding the decapsulated packet towards a destination address determined in accordance with information in the header of the decapsulated packet.

23. A node for forwarding a packet in a network, the node comprising:
a non-transitory memory storage comprising instructions; and
one or more processors in communication with the memory storage, wherein the one or more processors execute the instructions to:

receive the packet at a node belonging to a service function chain (SFC) in the network, wherein
the packet is encapsulated by a network service header (NSH) that includes a service path header that identifies a service path, and
direct one or more subsequent nodes within the network to treat the encapsulated NSH packet with a quality of service treatment based on a treatment value corresponding to the service path;
evaluate a forwarding table stored in the node to identify the service path and the treatment value of the encapsulated NSH packet and determine the quality of service treatment of the encapsulated NSH packet to be performed by the one or more subsequent nodes; and
forward the encapsulated NSH packet to the one or more subsequent nodes based on the service path indicated in the forwarding table and in accordance with the quality of service treatment corresponding to the treatment value identified in the forwarding table.

24. The node of claim 23, wherein:
the service path header includes a service path identifier (SPI) comprising a path index (PI) indicating the service path and a treatment index indicating the treatment value, and a service index (SI) indicating a location of the encapsulate NSH packet in the SFC, and
the treatment value indicates the quality of service treatment for the encapsulated NSH packet.

25. The node of claim 24, wherein the SPI comprises an upper most one or more bits of the service path header and the SI comprises a lower most one or more bits of the service path header,
the total number of the upper most one or more bits is 24,
the total number of the lower most one or more bits is 8, and
the total number of one or more bits comprising the service path header is 32.

26. The node of claim 24, wherein the treatment index comprises N one or more bits of the SPI, and the PI comprises (24−N) one or more bits of the SPI.

27. The node of claim 25, wherein
the one or more bits comprising the PI are in a fixed position of the upper most one or more bits in the SPI, and the one or more bits comprising treatment index are a fixed position in the lower most one or more bits of the SPI, or
the one or more bits of the PI and the treatment index are randomly positioned in the SPI.

28. The node of claim 23, wherein the forwarding table includes n entries for each service path of the encapsulated NSH packet, where n is a number of different treatment values associated with the service path.

29. The node of claim 24, wherein
the service path header includes the service index (SI) indicating the treatment value and a location of the packet in the service chain, and
the treatment value indicates the quality of service treatment for the encapsulated NSH packet.

30. The node of claim 23, wherein
the forwarding table comprises a service path identifier (SPI) indicating the service path, a service index (SI) indicating a location of the encapsulate NSH packet in the service chain, and a treatment index indicating the treatment value, and
the treatment value indicates the quality of service treatment for the encapsulated NSH packet.

31. The node of claim 23, wherein the network is an SFC-enabled domain.

32. The node of claim 23, the one or more processors further execute the instructions to process the encapsulated NSH packet according to a service function associated with the node.

33. The node of claim 23, the one or more processors further execute the instructions to decapsulate the encapsulated NSH packet by removing the NSH, and forward the decapsulated packet towards a destination address determined in accordance with information in the header of the decapsulated packet.

34. A node for forwarding a packet in a network, the node comprising:
a receiving module for receiving the packet at a node belonging to a service function chain (SFC) in the network, wherein
the packet is encapsulated by a network service header (NSH) that includes a service path header that identifies a service path, and
directing one or more subsequent nodes within the network to treat the encapsulated NSH packet with a quality of service treatment based on a treatment value corresponding to the service path;
an evaluating module for evaluating a forwarding table stored in the node to identify the service path and the treatment value of the encapsulated NSH packet and determining the quality of service treatment of the encapsulated NSH packet to be performed by the one or more subsequent nodes; and
a forwarding module for forwarding the encapsulated NSH packet to the one or more subsequent nodes based on the service path indicated in the forwarding table and in accordance with the quality of service treatment corresponding to the treatment value identified in the forwarding table.

* * * * *